(No Model.) 3 Sheets—Sheet 1.

J. DUNN & J. R. MOORE.
POTATO HARVESTER.

No. 550,234. Patented Nov. 19, 1895.

WITNESSES:
G. J. Blaudet,
Chas. E. Dawson

INVENTORS
J. Dunn
J. R. Moore.
BY
ATTORNEY (No Model.) 3 Sheets—Sheet 2.
J. DUNN & J. R. MOORE.
POTATO HARVESTER.
No. 550,234. Patented Nov. 19, 1895.
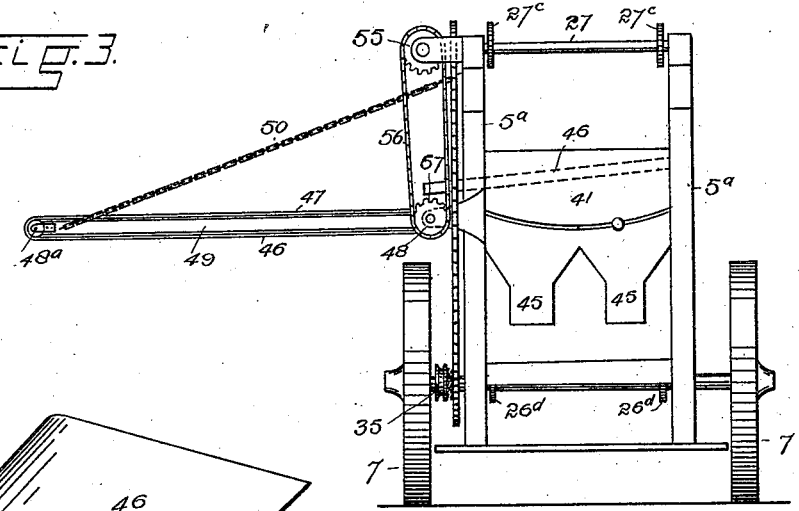
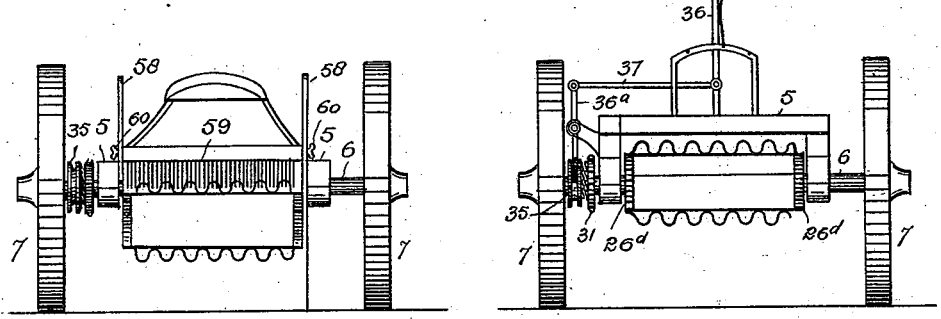
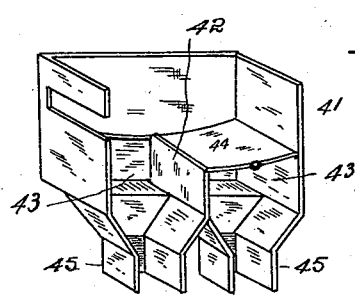
WITNESSES:
G. J. Rolander
Chas. E. Dawson
INVENTORS
J. Dunn
J. R. Moore
BY
ATTORNEY (No Model.) 3 Sheets—Sheet 3.
J. DUNN & J. R. MOORE.
POTATO HARVESTER.
No. 550,234. Patented Nov. 19, 1895.
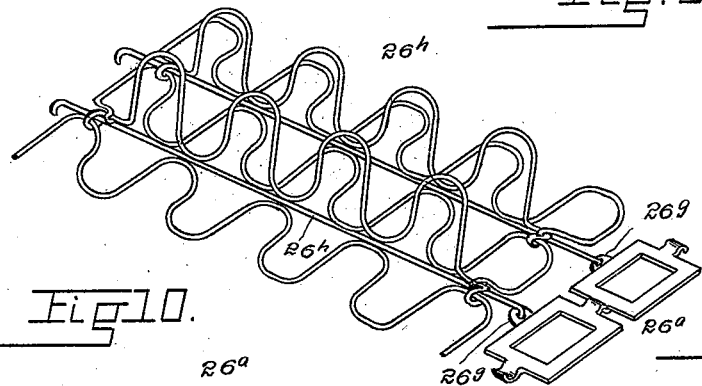
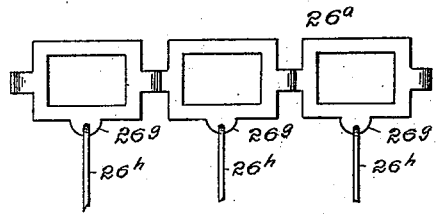
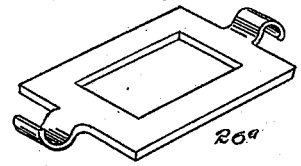
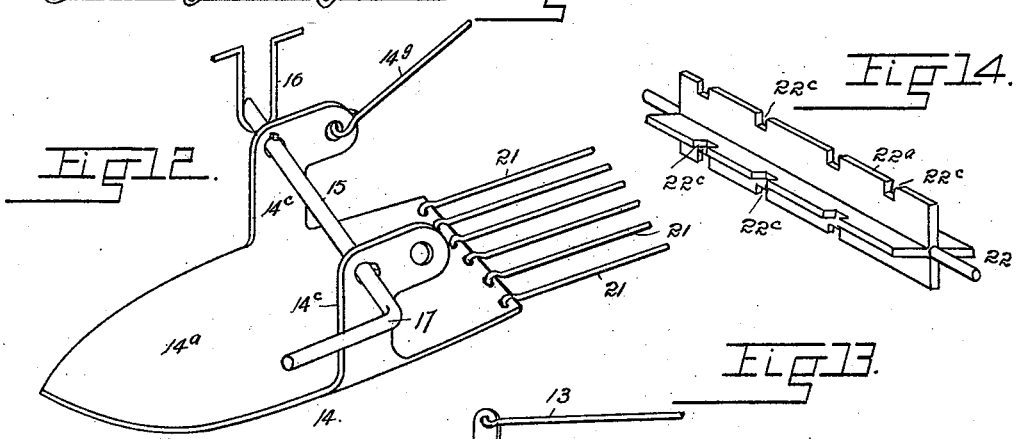
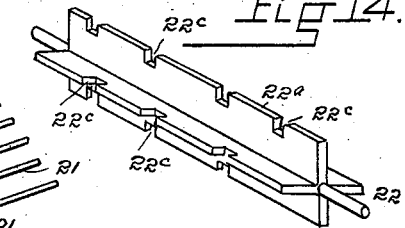
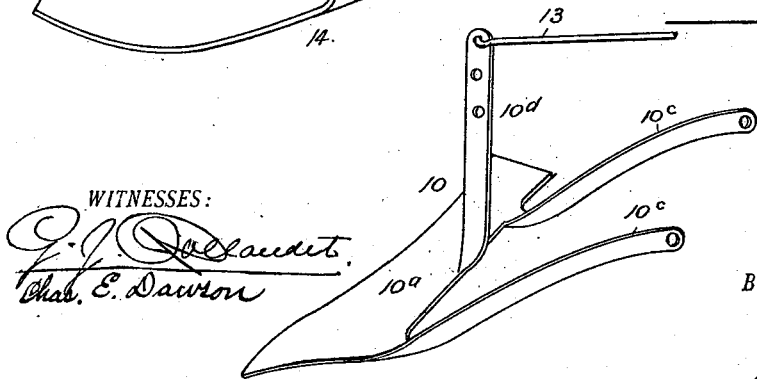
WITNESSES:
INVENTORS
J. Dunn
J. R. Moore
BY
ATTORNEY

UNITED STATES PATENT OFFICE.

JAMES DUNN AND JOSEPH R. MOORE, OF DENVER, COLORADO.

POTATO-HARVESTER.

SPECIFICATION forming part of Letters Patent No. 550,234, dated November 19, 1895.

Application filed December 22, 1894. Serial No. 532,691. (No model.)

*To all whom it may concern:*

Be it known that we, JAMES DUNN and JOSEPH R. MOORE, citizens of the United States of America, residing at Denver, in the county of Arapahoe and State of Colorado, have invented certain new and useful Improvements in Potato-Harvesters; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in potato-harvesters; and it consists of the features, arrangements, and combinations hereinafter described and claimed, all of which will be fully understood by reference to the accompanying drawings, in which is illustrated an embodiment thereof.

Figure 1:
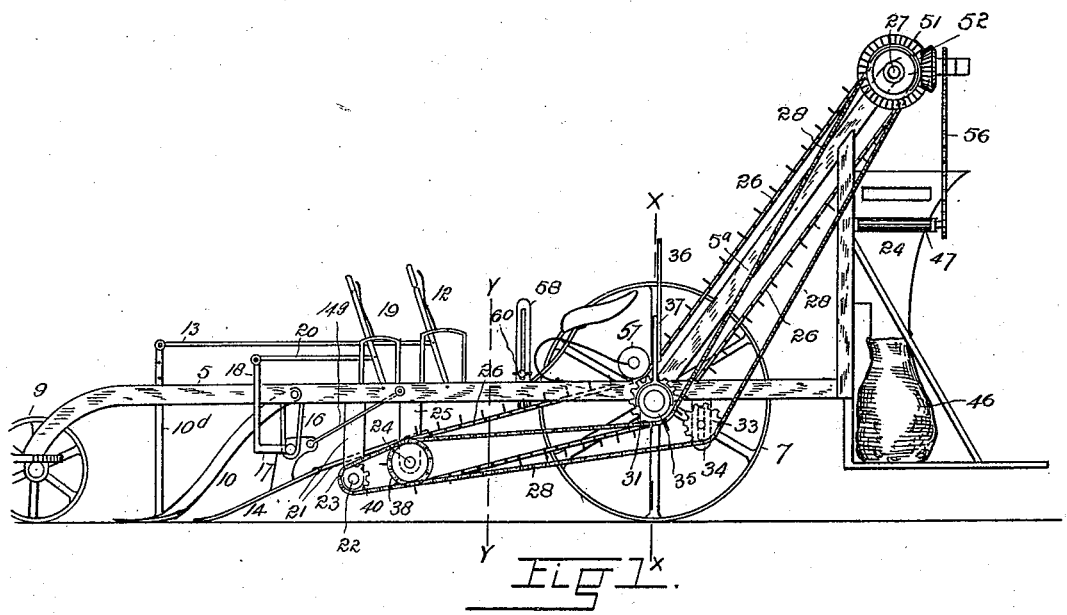
Figure 2:
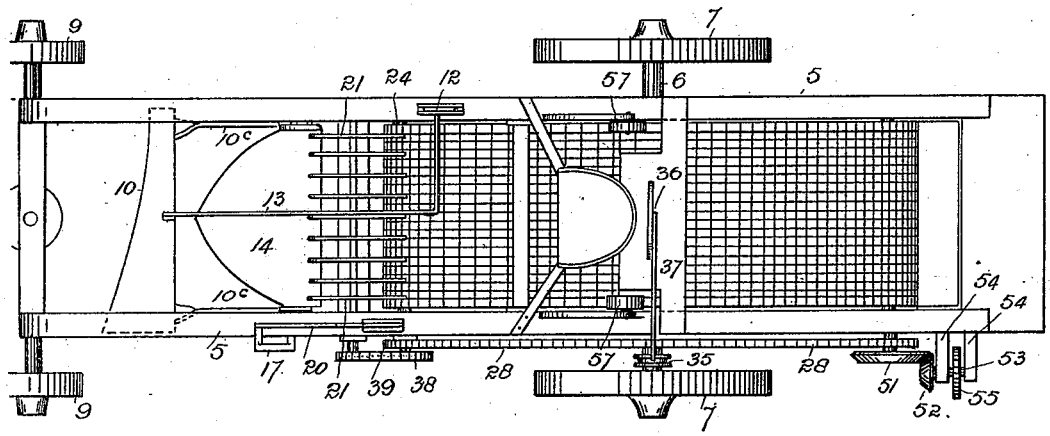

In the drawings, Figure 1 is a side elevation of the machine. Fig. 2 is a top or plan view thereof. Fig. 3 is a rear end view of the machine. Fig. 4 is a cross-section taken on the line $xx$, Fig. 1. Fig. 5 is a similar section taken on the line $yy$, Fig. 1. Fig. 6 is a perspective view of the sacking-hopper, the rear side of the casing being removed to show the inner structure. Fig. 7 is a fragmentary view in perspective of the lateral carrier shown in Fig. 3. Fig. 8 is a fragmentary view in perspective of the endless longitudinal apron or carrier shown on a larger scale. Fig. 9 is a detail view, in perspective, of one of the links of the sprocket-chain attached to the endless apron. Fig. 10 is a fragmentary view of the apron sprocket-chain shown in connection with the transverse rods of the apron. Fig. 11 is a side or edge view of the chain. Fig. 12 is a perspective view of the plow shown in connection with the shaker-rods. Fig. 13 is a perspective view of the vine-cutter. Fig. 14 is a perspective view in detail of the roller which engages and actuates the movable rods connected with the plow.

Similar reference characters indicating corresponding parts or elements in all the views, let the numeral 5 designate the frame, in which is journaled the main axle 6, mounted on the large wheels 7, and the front or auxiliary axle 8, mounted on the small wheels 9. Immediately to the rear of the wheels 9 is located the vine-cutter 10, composed of the share $10^a$, the rearwardly-extending arms $10^c$, and the upright arm $10^d$. The arms $10^c$ are pivoted on the frame 5. The vine-cutter is adjusted by means of a lever 12 and a connecting-rod 13, pivoted to the arm $10^d$. The lever is fulcrumed on the framework. In the rear of the vine-cutter is located the plow or digger 14, comprising a broad pointed share $14^a$ and upwardly-extending arms $14^c$. To these arms is made fast a transverse horizontal bar 15, supported by U-shaped hangers 16, attached to the frame. To the bar 15 is made fast a crank 17, formed integral with an upright bar 18.

The plow is controlled by a lever 19 and a connecting-rod 20, leading from the lever to the bar 18. The plow or digger-shovel is further supported by rods $14^g$, movably attached to the frame and pivoted to the rearwardly-extending projections formed on the arms $14^c$. Into apertures formed in the rear edge of the plow is hooked a series of rods 21, which extend rearwardly and rest in notches or recesses $22^c$, formed in the radial blades $22^a$ of the shaft 22. The notches $22^c$ are alternately arranged in the adjacent blades, whereby a shaking movement is imparted to the rods by the rotation of the shaft 22. This shaft is journaled in hangers 23, made fast to the framework. To the rear of the shaft 22 is located a shaft 24, journaled in hangers 25, attached to the frame. To the edges of the endless apron 26 are attached chains $26^a$, which engage sprockets $26^c$ on the shaft 24 and other sprockets $27^c$, made fast on a shaft 27, journaled in the upper extremities of the inclined rearwardly-extending bars $5^a$ of the framework. The chains $26^a$, attached to the edges of the apron, also engage intermediate sprockets $26^d$, made fast to the main axle 6 of the machine. The upper side of the apron is centrally engaged by spring-held rollers 57, which depress the apron between the shafts 24 and 27. This apron is operated by a chain 28, which engages sprockets made fast to the shafts 24 and 27 and the axle 6, respectively. This chain also engages a tension-sprocket 33, journaled in hangers 34, attached to the framework. This last-named sprocket is vertically adjustable in its hangers for obvious reasons.

Splined on the axle 6 is a clutch 35, having its toothed face adjacent and adapted to engage the counterpart clutch-face of the loose sprocket 31. This clutch 35 is adjustable on the axle through the instrumentality of levers 36 and 36ᵃ and a connecting-rod 37. The lever 36ᵃ projects into a circumferential groove formed in the clutch. When the toothed face of the clutch engages the corresponding face of the sprocket, it is evident that the endless apron 26 will move when the machine is in motion. Hence when the clutch-faces are disengaged the apron will stop. To the shaft 24 is made fast another sprocket 38, which is connected by means of a chain 39 with a sprocket 40, made fast on the shaft 22. By means of this connection the last-named shaft is operated.

Below the shaft 27 is located the hopper 41, separated by a partition 42 into two compartments 43. The front and rear sides of the hopper are interiorly grooved to engage the edges of a sliding plate 44 of sufficient area to close one compartment. This plate may be shifted from the outside of the hopper by means of a projecting knob or handpiece attached thereto. To the mouths or discharge extremities 45 of the hopper-compartments are attached the sacks 46, which receive the potatoes as they fall from the endless apron.

When it is desired to discharge the potatoes directly into a wagon-box or other receptacle, an inclined plate 46 is located in the upper part of the hopper, its lower extremity protruding through an opening formed therein. Beneath the extremity of this discharge-plate is located an endless carrier. (See Figs. 3 and 7.) This carrier engages drums journaled in bars 49 made fast to the frame and supported by chains 50. This lateral carrier is an alternative construction and of course is not employed when it is desired to sack the potatoes.

The carrier 47 is operated from the shaft 27, which for this purpose is provided with a fast bevel-gear 51, meshing with another gear 52, made fast on a short shaft 53, journaled in projections 54, attached to the main frame. This shaft 53 carries a fast sprocket 55, which is connected with a sprocket 67 by means of a chain 56. The sprocket 67 is fast on the journal or reduced extremity of one of the carrier-drums. (Not shown.)

Adjustably supported in slotted uprights 58, made fast to the frame, is a transverse brush 59, adapted to engage the endless apron 26. This brush facilitates the separation of the dirt from the potatoes. The brush 59 is vertically adjustable in its standards by means of set-screws 60, which pass through the slots of the standards and enter the brush extremities.

The endless apron or longitudinal carrier 26 comprises a series of wire-sections, each section having a number of serpentine bends formed therein. These serpentine-shaped wire-sections are alternately arranged in horizontal and vertical positions. (See Fig. 8.) The extremities of both the horizontal and vertical sections are formed into hooks. The hooked extremities of the two sets of sections engage each other and thus connect the sections, whereby they are formed into a continuous or endless carrier. The hooked extremities of the vertically-positioned sections also engage transverse rods 26ʰ, whose extremities terminate in hooks which engage apertured lugs 26ᵍ, formed on the links of the chain 26ᵃ, whereby the chain is attached to the carrier.

From the foregoing description the operation of the machine will be readily understood. As the machine is drawn over the field, the vine-cutter clears away the vines and the plow or digger raises the potatoes out of the earth. From the plow the potatoes pass to the shaker-rods 21, and thence to the endless apron or longitudinal carrier 26, which carries them upward and drops them into the hopper 41, whence they pass either into sacks or into a wagon drawn along beside the machine, as may be desired.

All the operative parts of the machine are actuated either directly or indirectly from the main axle 6, which rotates with the wheels 7.

Having thus described our invention, what we claim is—

1. In a potato-digger, the combination with the main frame and the axle, of the shafts 24 and 27 journaled in the frame to the front and rear of the axle respectively, an endless carrier having sprocket chains attached to its edges and engaging sprocket wheels on the said shafts and the axle, spring-held rollers adapted to depress the apron between the shafts 24 and 27, the axle being out of a direct line drawn from one shaft to the other, another chain for propelling the carrier, said chain engaging other sprockets on the shafts 24 and 27 and the axle respectively, and a tension sprocket journaled in hangers attached to the frame and engaging the propelling chain intermediate the shafts 24 and 27, substantially as described.

2. The endless carrier comprising a series of wire sections each having a number of serpentine bends, said sections being alternately arranged in horizontal, or approximately horizontal, and vertical positions, the extremities of both the horizontal and vertical sections being formed into hooks engaging each other, whereby the sections are formed into an endless carrier, substantially as described.

3. The endless carrier comprising the series of wire sections each having a number of serpentine bends, said sections being alternately arranged in horizontal, or approximately horizontal, and vertical positions, (assuming the plane of the carrier to be horizontal) the extremities of both the horizontal and vertical sections being formed into hooks engaging each other whereby the sections are formed into an endless carrier, transverse rods attached to the hooked extremities of the vertically positioned sections, said rods having hooked extremities, and chains having apertured lugs formed on their links which the hooked extremities of the rods engage, substantially as described.

4. In a potato harvester, the combination with the main frame and axle, of the shafts 24 and 27 journaled in the frame to the front and rear of the axle, respectively, an endless carrier composed of the serpentine sections arranged at right angles, or approximately at right angles, to each other and suitably connected, sprocket chains attached to the longitudinal edges of the carrier and engaging sprocket wheels on the said shafts and the axle, another chain for propelling the endless apron or carrier and engaging other sprockets on the shafts 24 and 27 and the axle respectively, substantially as described.

5. In a potato harvester, the combination with the framework and the axle journaled therein, of the shafts also journaled in the framework and located to the front and rear of the axle, the digging and sacking mechanism, the intermediate endless carrier composed of the serpentine sections arranged at right angles to each other and suitably connected, chains attached to the longitudinal edges of the carrier and engaging sprocket wheels on the said shafts and the axle, and means for propelling the carrier comprising a chain engaging sprockets on the two shafts and the axle, substantially as described.

In testimony whereof we affix our signatures in the presence of two witnesses.

JAMES DUNN.
JOSEPH R. MOORE.

Witnesses:
CHAS. E. DAWSON,
A. J. O'BRIEN.